(12) United States Patent
Muto

(10) Patent No.: US 7,428,577 B2
(45) Date of Patent: Sep. 23, 2008

(54) STATUS NOTIFICATION OF MONITORED DEVICES THROUGH ELECTRONIC MAIL

(75) Inventor: Shin Muto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/042,253

(22) Filed: Jan. 11, 2002

(65) Prior Publication Data

US 2002/0116480 A1 Aug. 22, 2002

(30) Foreign Application Priority Data

Jan. 17, 2001 (JP) .............................. 2001-009470
Jan. 17, 2001 (JP) .............................. 2001-009473

(51) Int. Cl.
*G06F 15/16* (2006.01)
*G06F 15/173* (2006.01)

(52) U.S. Cl. ...................................... 709/206; 709/224

(58) Field of Classification Search .................. 709/206, 709/224
See application file for complete search history.

(56) References Cited

U.S. PATENT DOCUMENTS

| 5,819,110 | A | 10/1998 | Motoyama ................... 395/835 |
| 6,003,070 | A * | 12/1999 | Frantz ......................... 709/206 |
| 6,003,078 | A | 12/1999 | Kodimer et al. ............. 709/224 |
| 6,192,403 | B1 * | 2/2001 | Jong et al. ................... 709/224 |
| 6,298,377 | B1 * | 10/2001 | Hartikainen et al. ........ 709/223 |
| 6,307,643 | B1 * | 10/2001 | Okada et al. ................ 358/1.15 |
| 6,430,711 | B1 * | 8/2002 | Sekizawa ...................... 714/47 |
| 6,581,092 | B1 * | 6/2003 | Motoyama et al. .......... 709/219 |
| 6,622,266 | B1 * | 9/2003 | Goddard et al. ............... 714/44 |
| 6,714,977 | B1 * | 3/2004 | Fowler et al. ................ 709/224 |
| 2002/0057449 | A1 * | 5/2002 | Chapman et al. ........... 358/1.15 |
| 2004/0267892 | A1 * | 12/2004 | Kikinis ........................ 709/206 |

FOREIGN PATENT DOCUMENTS

| EP | 0721268 | 7/1996 |
| JP | 07-297826 | 11/1995 |
| JP | 10-149302 | 6/1998 |
| JP | 2000-29807 | 1/2000 |
| JP | 2000-200226 | 7/2000 |

* cited by examiner

*Primary Examiner*—William C. Vaughn, Jr.
*Assistant Examiner*—Ranodhi N Serrao
(74) *Attorney, Agent, or Firm*—Fitzpatrick, Cella, Harper & Scinto

(57) ABSTRACT

Transmission data is generated depending on the status change of a device according to a message indicating the status information about the device and the destination information about the message and is transmitted by electronic mail, and the user who manages the device can be notified of the status of the device at an appropriate timing by a data transfer process apparatus, a device, a network system, a data transfer method, and a storage medium.

13 Claims, 17 Drawing Sheets

FIG. 3

| STATUS CHANGE NOTIFICATION TYPE |
| --- |
| STATUS CODE |
| ERROR COUNT |
| LINE STATUS |
| RESERVATION AREA |
| RESERVATION AREA |
| PANEL MESSAGE CHARACTER STRING LENGTH |
| PANEL MESSAGE CHARACTER STRING |
| . . . . . . . . . . . . . . . . . . |
| PANEL MESSAGE CHARACTER STRING |

FIG. 4

| 0×02 |
| --- |
| 40309 |
| 1 |
| 0 |
| 0 |
| 0 |
| 14 |
| "OIL PUMP" |
| "E9" |
| "OUT OF" |
| "ORDER" |

FIG. 6

| STATUS CODE | STATUS MESSAGE | STATUS DETAIL MESSAGE |
|---|---|---|
| 15000 | Toner is running short | Take out the toner cartridge, slowly shake it five or six times, and reset it. If the message still appears, set a new toner cartridge. |
| 40300 | The drum cartridge needs an exchange | Please the online key, continue the printing process, and then set a new drum cartridge |
| 40301 | The toner collection container has bocome full | Set a new toner collection container, and press the online key |
| 40302 | No drum cartridge is set | Set a drum cartridge, and press the online key |
| 40304 | The fixing silicon oil is running short | Set a new silicon oil bottle, and press the online key |
| 40305 | The fixing unit needs an exchange | Contact the shop you bought the product, and ask them to set a new fixing unit |
| 40306 | The silicon oil has run out | Set a new silicon oil bottle, and press the online key |
| 40307 | The fixing unit needs an exchange | Contact the shop you bought the product, and ask them to set a new fixing unit |
| 40308 | No fixing unit is set | Correctly set a fixing unit, and press the online key |
| 40309 | The silicon oil pump is out of order | Contact the shop you bought the product, and ask them to repair it |
| 40310 | The optional paper feed cassette is not correctly set | Correctly set the paper feed cassette |
| 40311 | The cover of the optional paper feed cassette is open | Close the cover of the paper feed cassette and press the online key |

FIG. 8

| DEVICE ERROR TYPE | STATUS CODE |
|---|---|
| OPERATOR CALL | 40∗∗∗,41∗∗∗,42∗∗∗∗,43∗∗∗∗,44∗∗∗ |
| SERVICE CALL | 50000 |

FIG. 9

| TYPE OF EXPENDABLES | STATUS CODE |
|---|---|
| TONER | 1500x,40501,40503,40505,40507,40509,40513 40515,40517,40519 |
| STAPLE | 15050,4013x |
| PHOTOSENSITIVE DRUM | 15100,15101,15110,15111,40300,40320,40321 |
| FIXING OIL | 15104,40304,40306 |
| FIXING UNIT | 15105,40307 |
| ITB UNIT | 15700 |
| DRUM CLEANER | 40301 |
| FIXING WEB | 40305 |

FIG. 10

[DEVICE ERROR NOTIFICATION]

1002 — FROM: "Development Unit Color PRINTER" ⟨00:00:85:04:67:89⟩
1003 — TO: prt-admin@100.ca.co.jp
1004 — SUBJECT: [DEVICE ERROR] (40309)                                                  } 1001
1005 — REPLAY-TO: net-prt-admin@bar.ca.co.jp
MINE-VERSION: 1.0
COTANT-TYPE: TAXT/PLAIN; CHARSET=ISO-2022-JP 1007 — Error has occurred 1008 — Silicon oil pump is out of order                                                 } 1006
Contact shop at which you bought the the pump, and ask for repair.

1010 — Product name: L-2260.
PAGE COUNT: 000506                                                                      } 1009
1011 — Installation Place: ox building 3F, Sales Section 3
Contact: System Monitor Section in System Information Department

FIG. 11

[EXPENDABLES EXCHANGE REQUEST NOTIFICATION]

FROM: "EIGYOU3KA" ⟨00:00:85:04:67:89⟩
TO: prt-admin@100.ca.co.jp
SUBJECT: [DEVICE ERROR] (15000)
REPLAY-TO: prt-support@bar.ca.co.jp
MINE-VERSION: 1.0
COTANT-TYPE: TAXT/PLAIN; CHARSET=ISO-2022-JP An expendables exchange request has been issued
Toner is running short
Take out the toner cartridge, slowly shake it 5 or 6 times, and reset it.
If the message still appears, set a new toner cartridge.

---

Product Name: L-950.
PAGE COUNT: 001234
Installation Place: OX BUILDING 3F, Sales Section 3
Contact: Fixtures Subsection in General Affairs Section Kensuke Sasaki    FAX 03-XXXX-XXXX

FIG. 17

| STATUS CODE | SUBSTITUTE STATUS MESSAGE | SUBSTITUTE STATUS DETAILED MESSAGE |
|---|---|---|
| 50000 | Trouble has occurred in the internal mechanism of the printer | Temporarily turn off electric power, and then turn it on again after 3 seconds or more. |

FIG. 18

[DEVICE ERROR NOTIFICATION (APPLYING SUBSTITUTE MESSAGE)]

FROM: "DEVELOPMENT DEPARTMENT COLOR PRINTER" 〈00:00:85:04:67:89〉

TO: prt-admin@100.ca.co.jp

SUBJECT: [DEVICE ERROR] (50000)

REPLAY-TO: net-prt-admin@bar.ca.co.jp

MINE-VERSION: 1.0

COTANT-TYPE: TAXT/PLAIN; CHARSET=ISO-2022-JP

Trouble has occurred in the internal mechanism of the printer

Temporarily turn off electric power, and then turn it on again after 3 seconds or more.

Product name: L-2260.

PAGE COUNT: 000506

Installation Place: ox Building 3F, Sales Section 3

Contact: System Monitor Section in System Information Department

STATUS NOTIFICATION OF MONITORED DEVICES THROUGH ELECTRONIC MAIL

BACKGROUND OF THE INVENTION

1. Field of the Invention

The present invention relates to a data transfer process apparatus, a device, a network system, a data transfer method, and a storage medium, and more specifically to a data transfer process apparatus, a device, a network system, a data transfer method, and a storage medium preferable in performing a data transfer process among a server device and a client apparatus connected to a network, and a device having a network control unit as an interface with the network and a device control unit for controlling the apparatus itself, setting a process performed in the data transfer process, and a controlling process in the device.

2. Related Background Art

Recently, a network system configured such that a client apparatus and various device are connected to a network, and a client apparatus obtains and monitors the information about the device has been widely known. In this type of network system, the information about the device cannot be obtained unless an application program (application software) exclusively used to obtain the information about the device is incorporated in advance into the client apparatus, and the application program are operating in the client apparatus.

To solve the above mentioned problem, for example, a network system which is configured such that the information about the status change of a device can be transferred as electronic mail to the client apparatus through the server device has been suggested. There is also a network system for providing a notification of the status of a device by electronic mail after limiting it to a specified state.

SUMMARY OF THE INVENTION

However, in the above mentioned conventional example, the information about the device informed of by electronic mail is transmitted after it is converted into a text message generated in a natural language readable by a user according to the information obtained from the device by the data transfer process apparatus connected to the device. Therefore, it has been necessary for the data transfer process apparatus connected to the device to hold in advance a text message corresponding to each piece of status information about the device to be connected.

Furthermore, in the above mentioned conventional technology, if the data transfer process apparatus is connected to different types of device, it is necessary to hold the status information obtained from the device as text messages depending on the types of respective device. Therefore, there has been the problem that the demands of storage capacity increase each time the number of types of corresponding device increases.

In addition, according to the above mentioned conventional technology, since a text message corresponding to each piece of status information about each device is held in the data transfer process apparatus, there has been the problem that the data transfer process apparatus is highly dependent on the type of device, thereby indicating low versatility.

Additionally, according to the above mentioned conventional technology, when the status of the device is limited to a predetermined state and notified of by electronic mail, it is necessary to set a notification condition for each status of the device, thereby introducing the problem that the setting load of the user becomes heavier with an increasing number of types of status.

The present invention has been developed to solve the above mentioned problems, and the first object of the present invention is to provide a data transfer process apparatus, a device, a network system, a data transfer method, and a storage medium capable of having the user who manages the device recognize the status of the device at an appropriate timing by transmitting by electronic mail the transmission data generated according to the message for the status information about the device based on the status change of the device and the destination information.

In addition, the present invention has been developed to solve the above mentioned problems, and the second object of the present invention is to provide a data transfer process apparatus, a device, a network system, a data transfer method, and a storage medium capable of instructing the device from any client apparatus to obtain and transfer the information for management of the device without using an exclusive application program.

Additionally, the present invention has been developed to solve the above mentioned problems, and the third object of the present invention is to provide a data transfer process apparatus, a device, a network system, a data transfer method, and a storage medium capable of: setting the network control unit, which performs a data transfer process between a client apparatus and the device, free of holding information dependent on the device by holding a message indicating each status of the device in the device control unit of the device; and applying the above mentioned network control unit as is to the device including a different device control unit having the same system configuration.

Furthermore, the present invention has been developed to solve the above mentioned problems, and the fourth object of the present invention is to provide a data transfer process apparatus, a device, a network system, a data transfer method, and a storage medium capable of allowing a user who receives electronic mail to inquire the device of an appropriate contact without considering the mail address of the manager, the maintenance staff, etc. by setting in advance the mail address of the manager, the maintenance staff, etc. of the device as the destination address of an answer to the electronic mail transmitted from the device.

Additionally, the present invention has been developed to solve the above mentioned problems, and the fifth object of the present invention is to provide a data transfer process apparatus, a device, a network system, a data transfer method, and a storage medium capable of quickly issuing an inquiry to an appropriate contact depending on the status of the device by setting, for example, the mail address of the maintenance staff in response to a device error message, the mail address of the fixtures in response to an expendables exchange request, etc. depending on the type of status of the device.

BRIEF DESCRIPTION OF THE DRAWINGS

FIG. 3 shows an example of the format of the transmission data relating to the status of the device transmitted from the device control unit of the device shown in FIG. 1 according to the first and third embodiments of the present invention;

FIG. 4 shows an example of the transmission data from the device control unit of the device following the format example shown in FIG. 3 according to the first and third embodiments of the present invention;

FIG. 6 shows an example of the status message data showing each status of the device stored in the device control unit of the device shown in FIG. 1 according to the first embodiment of the present invention;

FIG. 8 shows an example of a status code corresponding to each error status of the device stored in the network control unit of the device shown in FIG. 1 according to the first and third embodiments of the present invention;

FIG. 9 shows an example of a status code corresponding to each expendables exchange request status of the device stored in the network control unit of the device shown in FIG. 1 according to the first and third embodiments of the present invention;

FIG. 10 shows an example of transmitting electronic mail when an error occurs in the device generated by the network control unit of the device shown in FIG. 7 according to the first and third embodiments of the present invention;

FIG. 11 shows an example of transmitting electronic mail when an expendables exchange request is issued in the device generated by the network control unit of the device shown in FIG. 7 according to the first embodiment of the present invention;

FIG. 17 shows an example of substitute message data of the status message showing the status of the device stored in the network control unit of the device shown in FIG. 1 according to the third embodiment of the present invention;

FIG. 18 shows an example of transmitting electronic mail when a substitute status message stored in the network control unit is applied if an error occurs in the device shown in FIG. 1 according to the third embodiment of the present invention;

DETAILED DESCRIPTION OF THE PREFERRED EMBODIMENT

First, the present invention is roughly described below before explaining the embodiments of the present invention. According to the present invention, the status information about a device is obtained depending on the status change of the device as a text message generated in a natural language readable by a person, and the status information about the device is provided for a client apparatus by electronic mail. Furthermore, the error level of each status of the device is defined, and the status of the device is provided by electronic mail for a notification destination set for each error level. Furthermore, notification information set depending on the error level of the state generated in the device is added, and the status of the device is provided by electronic mail. The embodiments of the present invention are described below in detail by referring to the attached drawings.

First Embodiment

Figure 1:
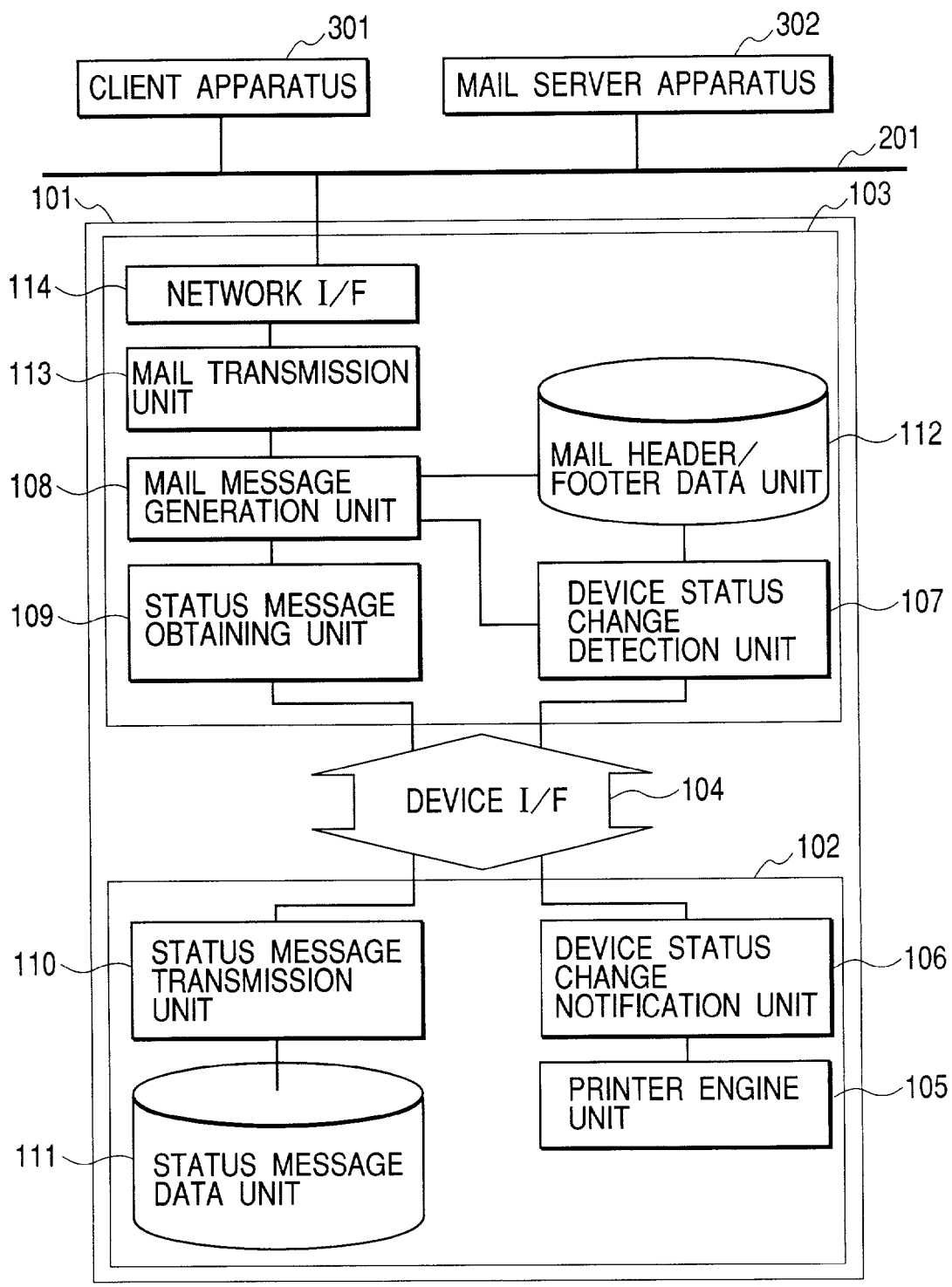
FIG. 1 is a block diagram showing an example of the configuration of a network system having a device, a client apparatus, and a mail server apparatus according to the first and third embodiments of the present invention.

FIG. 1 is a block diagram showing the configuration of a network system comprising a device, a client apparatus, and a mail server apparatus according to the first embodiment of the present invention. The first embodiment of the present invention corresponds to claim 1. The network system according to the first embodiment of the present invention comprises a device 101, a client apparatus 301, and a mail server apparatus 302. The device 101 comprises: a device control unit 102 comprising a printer engine unit 105, a device status change notification unit 106, a status message transmission unit 110, and a status message data unit 111; a network control unit 103 comprising a device status change detection unit 107, a mail message generation unit 108, a status message obtaining unit 109, a mail header/footer data unit 112, a mail transmission unit 113, and a network I/F 114; and a device I/F 104. In FIG. 1, reference numeral 201 denotes a network.

When the above mentioned configuration is described in detail, the device 101 is connected to the network 201 such as Ethernet (LAN of bus structure developed by US Xerox, DEC, and Intel in cooperation). According to the first embodiment of the present invention, the case in which the device 101 is a printer is described. The detailed configuration of the device 101 is described later.

The client apparatus 301 is a device configured by, for example, a personal computer (PC), etc., and is connected to the network 201. The electronic mail server apparatus (hereinafter referred to as a mail server apparatus) 302 is a device for transferring electronic mail, and is connected to the network 201. In this case, each user has its own electronic mail address, and the mail server apparatus 302 allots the electronic mail when the client apparatus 301 is connected to the mail server apparatus 302. The information including the electronic mail from the device 101 to the client apparatus 301 is transferred through the mail server apparatus 302.

The device 101 comprises the device control unit 102 for controlling the device itself and the network control unit 103 as an interface with the network. The device control unit 102 and the network control unit 103 are connected through the device I/F 104. In the device control unit 102, the printer engine unit 105 is integrally configured by various control appliances and printing appliances (not shown in the attached drawings) relating to a printing process. The device status change notification unit 106 monitors the status of the printer engine unit 105, and notifies the network control unit 103 of the information about the status of the printer engine unit 105 through the device I/F 104 depending on the status of the printer engine unit 105.

In the network control unit 103, the device status change detection unit 107 obtains the information (status information) about the status of the device 101 from the device control unit 102. The mail message generation unit 108 generates transmission data to be transmitted to the client apparatus 301 according to the information about the status of the device 101 obtained from the device status change detection unit 107, and the notification information (destination information). Furthermore, the mail message generation unit 108 sets the reply destination address of the electronic mail in the above mentioned transmission data. The reply destination address refers to the address to which an answer is transmitted in response to the electronic mail.

At an instruction of the mail message generation unit 108, the status message obtaining unit 109 obtains from the status message transmission unit 110 the information about the status of the device 101 as a message in a natural language readable by a person.

According to the first embodiment of the present invention, the address of the reply to the electronic mail can be any mail address at which a user can quickly issue an inquiry to an appropriate contact, for example, the mail address of the manager of the device, the mail address of the maintenance staff of the device, the mail address of the fixtures manager of the device, etc. Furthermore, setting a reply destination address prevents the user from transmitting a reply to the electronic mail to the device 101 when the user receives the electronic mail from the device 101.

In the device control unit 102, the status message transmission unit 110 transmits the information about the status of the device 101 as a message in a natural language readable by a person to the network control unit 103 at a request from the status message obtaining unit 109. The status message data unit 111 holds the information about various states of the device 101 as a message in a natural language readable by a person.

The mail header/footer data unit 112 stores notification information (destination information) to be added when electronic mail is transmitted to the client apparatus 301, and the information is referred to when the mail message generation unit 108 generates a transmission data. The mail transmission unit 113 transfers the transmission data generated by the mail message generation unit 108 as electronic mail from the network I/F 114 to the client apparatus 301 through the mail server apparatus 302.

Next, the procedure of the data transfer process in the device 101 of the network system according to the first embodiment of the present invention with the above mentioned configuration is described below in detail by referring to the flowcharts shown in FIGS. 2, 5, and 7, and FIGS. 3, 4, 6, 8, 9, 10, and 11.

Figure 2:
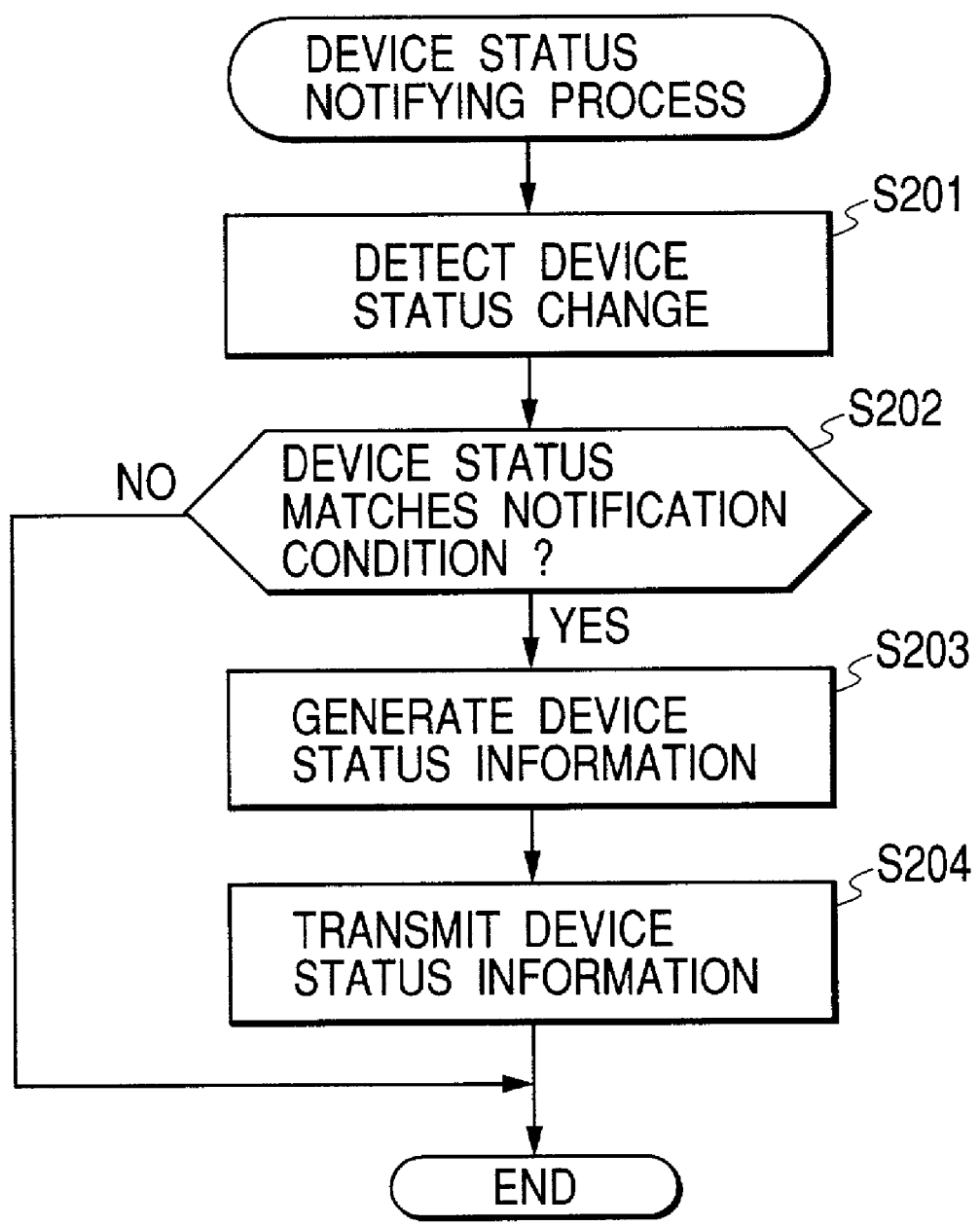
FIG. 2 is a flowchart showing an example of the first data transfer process performed by the device control unit of the device shown in FIG. 1 according to the first and third embodiments of the present invention.

FIG. 2 is a flowchart of the process of notifying the network control unit 103 of the status of the device 101 in the device control unit 102 of the device 101 according to the first embodiment of the present invention. Although not shown in the attached drawings, the control program for performing this process is stored in the storage medium in the device control unit 102, and executed by the device control unit 102.

In step S201, the device control unit 102 monitors the status of the printer engine unit 105 of the device control unit 102. If it is determined that the status of the printer engine unit 105 has changed, then control is passed to step S202. If it is determined that the status of the printer engine unit 105 has not changed, then control is returned to step S201, and the device control unit 102 monitors the status of the printer engine unit 105.

In step S202, the device control unit 102 determines whether or not the network control unit 103 is notified of the current status of the printer engine unit 105 based on the notification condition of the device status set in advance in the device control unit 102. If it is determined that the network control unit 103 is to be notified of the status, then control is passed to step S203. If it is determined that the network control unit 103 is not to be notified of the status, then control is returned to step S201 again, and the status of the printer engine unit 105 is monitored.

In step S203, the device control unit 102 generates the device status information about the current statuses of the printer engine unit 105 in the format shown in FIG. 3 such as: a status change notification type storing a value indicating whether the current status is a status change caused by an error or a status change without an error, for example, from a wait status to a process status; a status code storing a value corresponding to the current status; an error count indicating the number of current errors; a line status indicating whether or not print data can be transmitted to the device 101; panel message character string information displayed on a display panel of the device 101, etc. as the transmission data shown in FIG. 4, and control is passed to step S204.

In step S204, the device control unit 102 transmits the device status information to the network control unit 103, control is returned to step S201 again, and the device control unit 102 monitors the status of the printer engine unit 105.

FIG. 4 shows an example of the transmission data according to the first embodiment of the present invention. In the example of transmission data shown in FIG. 4, the status change notification type '0×02' indicates a status change with an error, the status code '40309' indicates an abnormal status of the oil pump of the printer engine unit 105, the error count '1' indicates the total number of current errors is 1, the line status '0' indicates the status in which print job data cannot be received, the panel message character string 'E9 OIL PUMP OUT OF ORDER' indicates that the character string 'E9 OIL PUMP OUT OF ORDER' is displayed on the display panel of the device 101.

Figure 5:
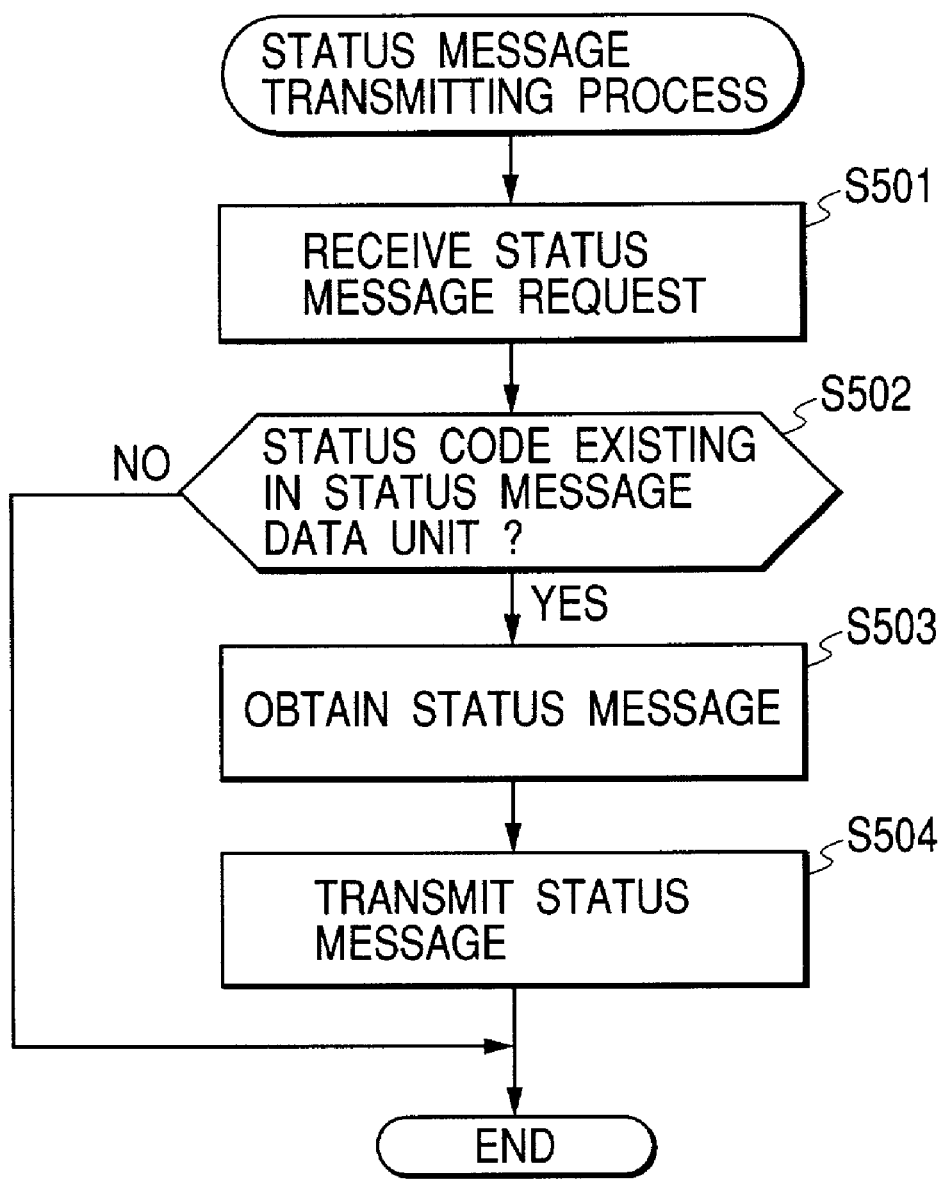
FIG. 5 is a flowchart of an example of the second data transfer process performed by the device control unit of the device shown in FIG. 1 according to the first and third embodiments of the present invention.

FIG. 5 is a flowchart of the process performed when the status information about the device 101 in the device control unit 102 of the device 101 according to the first embodiment of the present invention is transmitted to the network control unit 103 as a message in a natural language readable by a person. Although not shown in the attached drawings, the control program for performing this process is stored in the storage medium in the device control unit 102, and executed by the device control unit 102.

In step S501, the device control unit 102 receives from the network control unit 103 a status code transmitted as a request to obtain a message indicating a device status.

In step S502, the device control unit 102 determines whether or not the status message and the status detailed message exist corresponding to the requested status code from the status message data unit 111 storing status messages and status detailed messages corresponding to respective status codes as shown in FIG. 6 stored in the device control unit 102. When there are the status message and the status detailed message corresponding to the status code, control is passed to step S503. When there are no status message and status detailed message, the process terminates.

In step S503, the device control unit 102 obtains the status message corresponding to the status code from the status message data unit 111 of the device control unit 102, and transmits it to the network control unit 103 in step S504, thereby terminating the process.

Thus, for example, when a request to obtain a message corresponding to the status code '40300' is received from the network control unit 103, the data of the status message and the status detailed message described in the line of the status code '40300' shown in FIG. 6 is transmitted to the network control unit 103.

Figure 7:
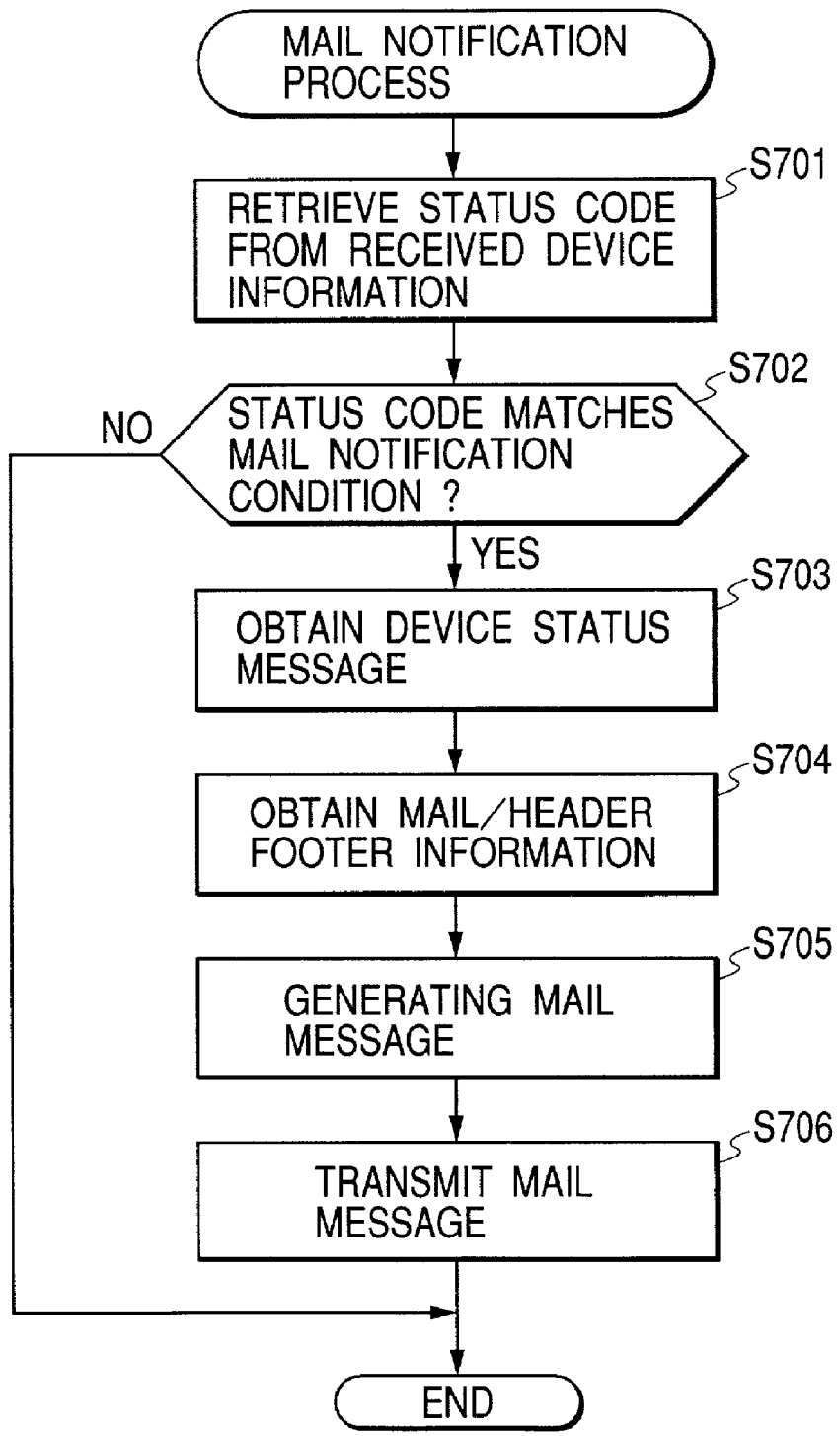
FIG. 7 is a flowchart of an example of the data transfer process performed by the network control unit of the device shown in FIG. 1 according to the first embodiment of the present invention.

FIG. 7 is a flowchart of the process performed when the status information about the device 101 is transmitted as electronic mail to the client apparatus 301 through the mail server apparatus 302 connected to the network 201 in the network control unit 103 of the device 101 according to the first embodiment of the present invention. Although not shown in the attached drawings, the control program for performing this process is stored in the storage medium in the network control unit 103, and executed by the network control unit 103.

In step S701, when the network control unit 103 receives the status information about the device 101 from the device control unit 102, it obtains a status code from the received status information, and control is passed to step S702.

In step S702, the network control unit 103 determines whether or not the status code assigned to each notification type and stored in the network control unit 103 as shown in FIGS. 8 and 9 matches the status code obtained from the device control unit 102. If they match each other, then control is passed to step S703. If they do not match each other, then the process terminates.

In step S703, the network control unit 103 obtains from the device control unit 102 as a message in a natural language readable by a person the status information about the device 101 corresponding to the status code obtained from the device control unit 102, thereby passing control to step S704.

In step S704, the network control unit 103 obtains the destination of the electronic mail and the information to be added to the electronic mail from the mail header/footer data unit 112 holding in advance the mail header and hooter information about the network control unit 103, thereby passing control to step S705.

In step S705, the network control unit 103 generates the transmission data of electronic mail by composing the information obtained in steps S703 and S704, thereby passing control to step S706.

In step S706, the network control unit 103 transmits the transmission data indicating the status information about the device 101 as electronic mail to the destination client apparatus 301 through the mail server apparatus 302 connected to the network 201, thereby terminating the process.

FIG. 8 is an explanatory view of the status code corresponding to each error status in the device 101 according to the first embodiment of the present invention. In the example shown in FIG. 8, the operator call is assigned a status code corresponding to the status of an error in which a user can perform a recovery process in the errors occurring in the device 101 such as paper jam, etc. On the other hand, a service call is assigned a status code indicating the status of an error from which it is difficult for a user to recover, for example, a fault of the device 101, etc.

FIG. 9 is an explanatory view of the status code corresponding to a request to exchange various expendables used by the device 101 according to the first embodiment of the present invention. In the example shown in FIG. 9, for example, status codes indicating a request to exchange a toner cartridge, a request to supply staples of a stapler used when plural sheets of printed paper are to be bound, etc. are assigned. In addition, status codes of a photo-sensitive drum, fixing oil, a fixing device, an ITB unit, a drum cleaner, a fixing WEB, etc. are assigned.

FIG. 10 is an explanatory view of an example of transmitting electronic mail generated by the network control unit 103 of the device 101 shown in FIG. 7 according to the first embodiment of the present invention when an error occurs in the device 101. In FIG. 10, reference numeral 1001 denotes a mail header portion, that is, a data portion containing the transmission information about electronic mail, and comprises the information indicated by 1002 to 1005. Reference numeral 1002 denotes data indicating a transmission source, and contains, for example, the name specifying the device 101, the address information, etc. Reference numeral 1003 denotes data indicating a transmission destination, and contains address information specifying the destination user in the client apparatus 301. Reference numeral 1004 denotes data indicating the subject of the electronic mail, and contains the information indicating that the current electronic mail has been issued because a device error has occurred. Reference numeral 1005 denotes data indicating the transmission destination, and contains address information referred to when it is necessary to transmit a reply to the electronic mail.

Reference numeral 1006 denotes a message portion, that is, a data portion containing status information about the device 101, and comprises the information indicated by 1007 and 1008. Reference numeral 1007 denotes a message indicating the status type of the device 101, and indicates that an error has occurred in the device 101 in this example. Reference numeral 1008 denotes a message indicating the status of the device 101, and contains the information about the status message and the status detailed message obtained from the device control unit 102.

Reference numeral 1009 denotes a mail footer portion, that is, a data portion comprising additional information relating to the device 101 added to the client apparatus 301, and comprises the information indicated by 1010, 1011, etc. Reference numeral 1010 denotes the information specific to the device 101, and contains, for example, the name of a product of the device 101, the total number of pages printed on the device 101 when the current electronic mail is generated, etc. Reference numeral 1011 denotes an optional message relating to the device 101 predetermined by the setting means described later. In this example, it indicates the installation position of the device 101, the message of the contact, etc. to the manager of the device 101, etc.

FIG. 11 is an explanatory view of an example of transmitting electronic mail generated by the network control unit 103 of the device 101 shown in FIG. 7 according to the first embodiment of the present invention, and transmitted when a status change of a request to exchange expendables of the device 101 is made. For example, when toner used by the printer engine unit 105 performing a printing process is running short, a message prompting the destination user to exchange a toner cartridge is transmitted by electronic mail.

As described above, in the network system according to the first embodiment of the present invention, the device 101 comprises the device status change detection unit 107 for obtaining the status information about the status of the device, the status message obtaining unit 109 for obtaining a message in a natural language readable by a person, the mail header/footer data unit 112 for storing destination information, the mail message generation unit 108 for generating transmission data according to the message and the destination information, and the mail transmission unit 113 for transmitting the generated transmission data as electronic mail to the client apparatus 301, thereby obtaining the following operations and effects.

With the above mentioned configuration, when a status change such as an error, etc. occurs in the device 101, the network control unit 103 generates transmission data from the message in a natural language readable by a person obtained from the device control unit 102, and notifies the user of the client apparatus 301, which is the destination of the notification through the mail server apparatus 302, about the status of the device 101 at an appropriate timing by electronic mail according to the electronic mail address held in the mail header/footer data unit 112.

That is, since the transmission data generated according to the message corresponding to the status information about the device 101 based on the status change of the device 101 and the destination information is transmitted to the client apparatus 301 as electronic mail, the user managing the device 101 can be allowed to recognize the status of the device 101 at an appropriate timing.

In addition, by holding the message indicating each status of the device 101 in the device control unit 102 of the device 101, it is not necessary for the client apparatus 301 for performing the data transfer process between the client apparatus 301 and the device 101 to hold the information dependent on the device 101. Therefore, the above mentioned network control unit 103 can be applied as is to a device having the same system configuration but comprising a different device control unit.

Therefore, it is possible to provide a device and a network system capable of efficiently notifying the user of the client apparatus of the information about the status of the device.

Furthermore, by setting in advance the mail address of the manager of the device 101, the maintenance staff, etc. as the address of the reply to the electronic mail, the user who has received electronic mail can quickly issue an inquiry about the device 101 to an appropriate contact without considering the mail address of the manager, the maintenance staff, etc.

Furthermore, depending on the status type of the device 101, for example, the mail address of the maintenance staff can be set as a reply destination address in case of a device error, and the mail address of the fixtures manager can be set as a reply destination address in case of a request to exchange expendables. As a result, an inquiry can be quickly issued to an appropriate contact depending on the status of the device 101.

Therefore, a system capable of further reducing the load of the user involved in the maintenance management of the device can be successfully provided.

Second Embodiment

Figure 12:
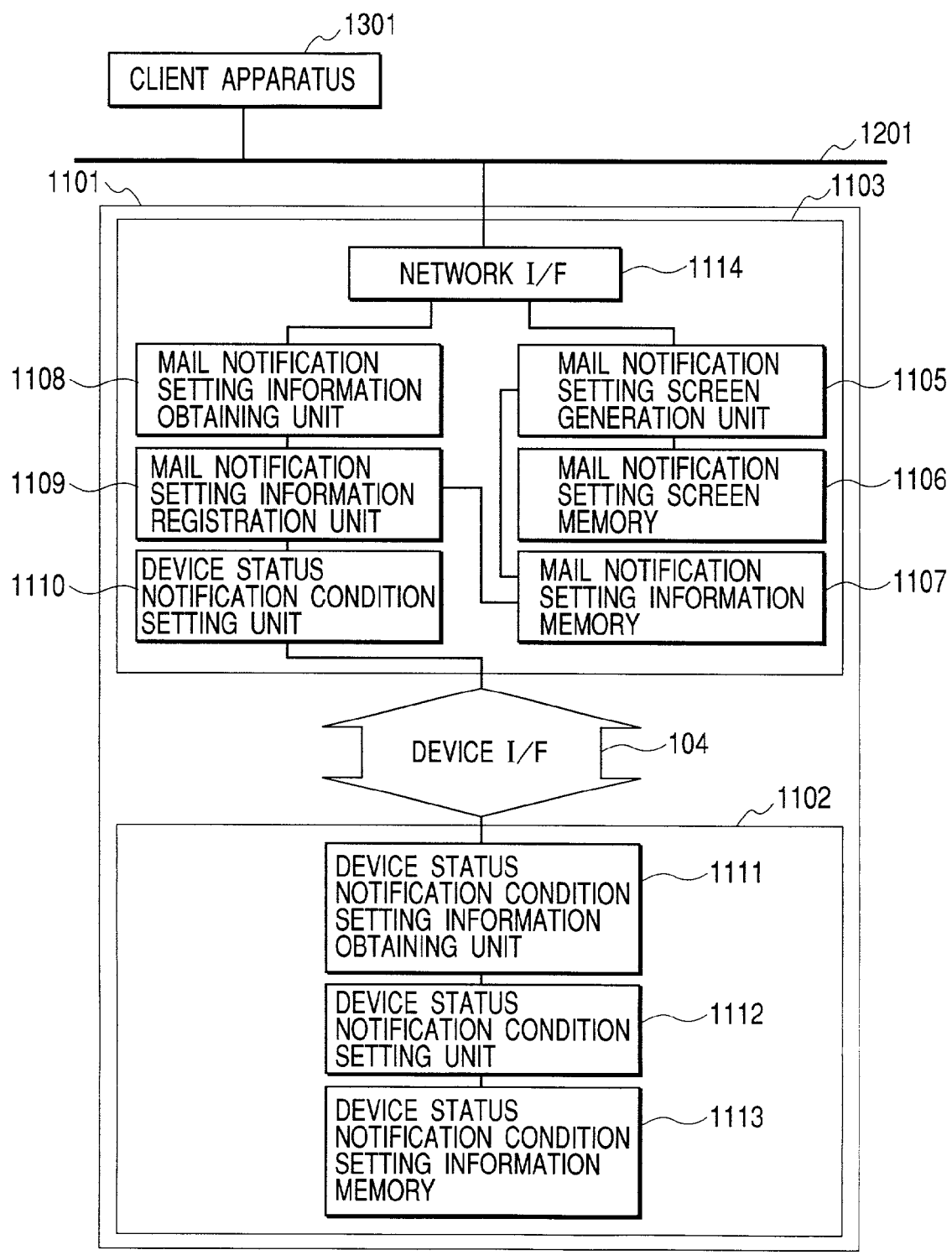
FIG. 12 is a block diagram of an example of the configuration of the network system having a device and a client apparatus according to the second embodiment of the present invention.

FIG. 12 is a block diagram of the configuration of the network system having a device and a client apparatus according to the second embodiment of the present invention. The second embodiment of the present invention corresponds to claim 4. The network system according to the second embodiment of the present invention comprises a device 1101 and a client apparatus 1301. The device 1101 comprises: a device control unit 1102 comprising a device status notification condition setting information obtaining unit 1111, a device status notification condition setting unit 1112, and device status notification condition setting information memory 1113; a network control unit 1103 comprising a mail notification setting screen generation unit 1105, mail notification setting screen memory 1106, mail notification setting information memory 1107, a mail notification setting information obtaining unit 1108, a mail notification setting information registration unit 1109, a device status notification condition setting unit 1110, and a network interface 1114; and a device interface 1104. In FIG. 12, reference numeral 1201 denotes a network.

The above mentioned configuration is described below in detail. That is, the device 1101 is connected to the network 1201. According to the second embodiment of the present invention, the device 1101 is a printer. Furthermore, at least one client apparatus 1301 configured by a personal computer (PC), etc. is connected to the network 1201. The device 1101 comprises the device control unit 1102 for controlling the device itself and the network control unit 1103 as an interface with the network. The device control unit 1102 and the network control unit 1103 are connected through the device interface 1104.

Figure 13:
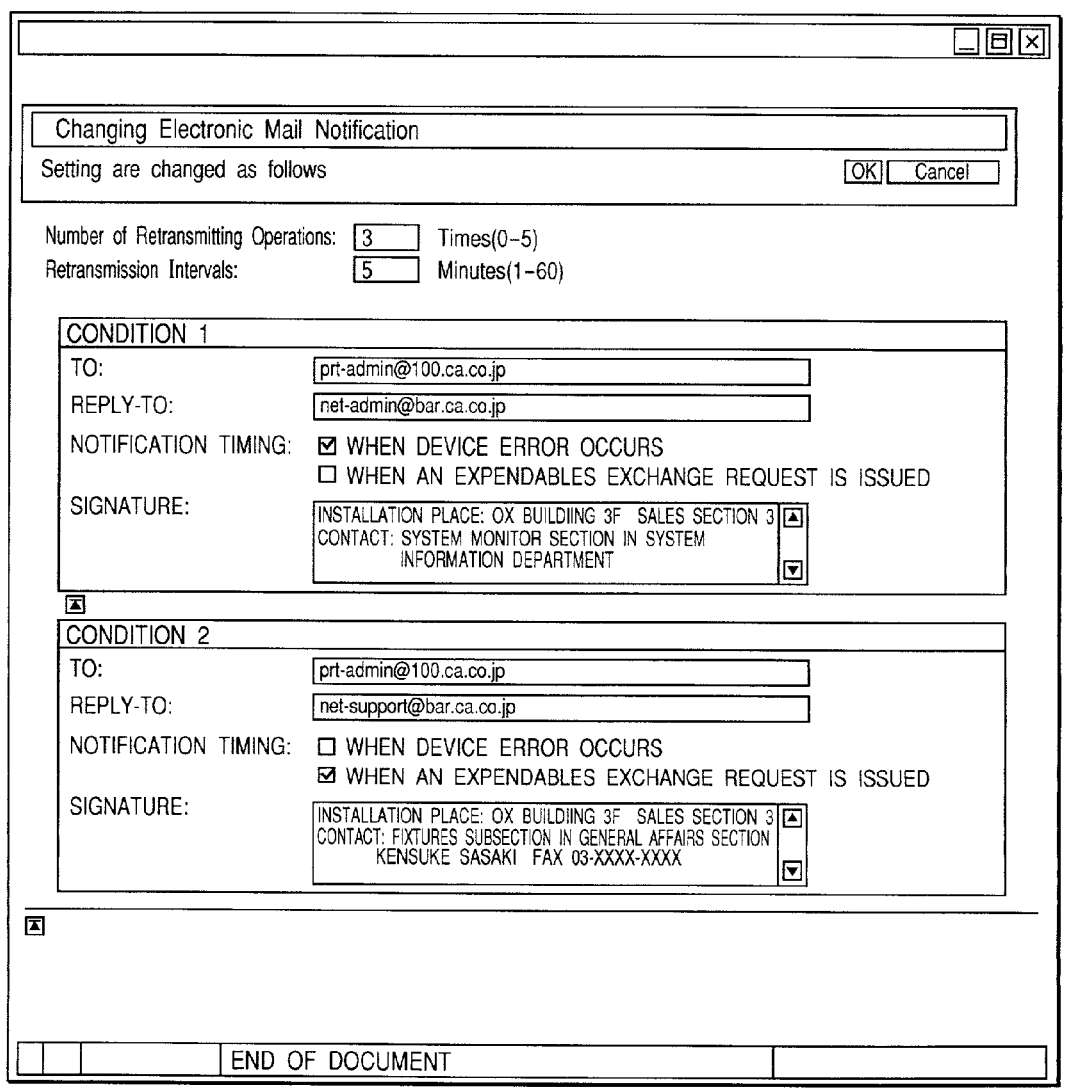
FIG. 13 shows an example of displaying a mail notification setting screen displayed on the client apparatus shown in FIG. 12 according to the second embodiment of the present invention.

In the network control unit 1103, the mail notification setting screen generation unit 1105 generates GUI (Graphical User Interface) data displayable on the GUI of the WEB browser, etc. operating in the client apparatus 1301. The GUI data generated by the mail notification setting screen generation unit 1105 is transmitted to the client apparatus 1301 through the network interface 1114, thereby providing a GUI for setting mail notification as shown in FIG. 13 in the client apparatus 1301. The WEB browser of the client apparatus 1301 interprets the received GUI data, and displays a screen as shown in FIG. 13. Thus, the user can set mail notification without an application program exclusively used to set mail notification.

The mail notification setting screen memory 1106 stores screen information required for the GUI data generated by the mail notification setting screen generation unit 1105. The mail notification setting information memory 1107 stores the currently set mail notification setting information (transmission setting information) such as, for example, the destination of electronic mail, a notification condition, etc., and the information is referred to when GUI data is generated by the mail notification setting screen generation unit 1105.

Furthermore, the mail notification setting information (transmission setting information) of the mail notification setting information memory 1107 stores a reply destination address of electronic mail. According to the second embodiment of the present invention, the reply destination address of the above mentioned electronic mail can be a mail address at which inquiry can be quickly issued from a user to an appropriate contact, for example, the mail address of the manager of the device, the mail address of the maintenance staff of the device, the mail address of the fixtures manager of the device, etc.

The mail notification setting information obtaining unit 1108 obtains the mail notification setting information set by the client apparatus 1301 through the network interface 1114. The mail notification setting information registration unit 1109 updates the mail notification setting information stored in the mail notification setting information memory 1107 according to the mail notification setting information obtained by the mail notification setting information obtaining unit 1108. In addition, if a mail notification condition that, for example, a status notification is issued only when an error occurs is changed in the above mentioned mail notification setting information, then the device status notification condition setting unit 1110 sets a status notification condition of the device 1101 notified by the device control unit 1102.

In the device control unit 1102, the device status notification condition setting information obtaining unit 1111 obtains a status notification condition about the device 1101 transmitted from the device status notification condition setting unit 1110. The device status notification condition setting unit 1112 stores a status notification condition of the device 1101 in the device status notification condition setting information memory 1107 in the device control unit 1102.

Furthermore, the device control unit 1102 comprises status detection means (not shown in the attached drawings) for detecting the status generated in the device 1101; and status notification means (not shown in the attached drawings) for notifying the network control unit 1103 of the detected status depending on the mail notification setting information held in the mail notification setting information memory 1107.

Then, the operations of the network system according to the second embodiment of the present invention with the above mentioned configuration are described below in detail by referring to FIGS. 12, 13, 14, and 15.

FIG. 13 is an explanatory view of an example of displaying a mail notification setting screen displayed on the display unit of the client apparatus 1301 according to the second embodiment of the present invention. FIG. 13 shows an example in which electronic mail notification can be set on two different setting conditions for the device 1101.

For example, on the condition 1, electronic mail is transmitted to a notification destination set with a "To" address only when an error occurs in the device 1101. Furthermore, the input portion of the "To" address with which the destination is set can contain a plurality of addresses delimited by a comma (,) as shown by the "To" address of the above mentioned condition 1. The mail set in the condition 1 in FIG. 13 is transmitted to the two destinations, that is, 'prt-admin@ca.co.jp' and 'Sys-admin@ca.co.jp'.

In addition, the address information set in the "Reply-To" address portion is stored as a reply destination address of the electronic mail in the network control unit 1103 of the device 1101, and contained when the electronic mail is transmitted.

Figure 14:
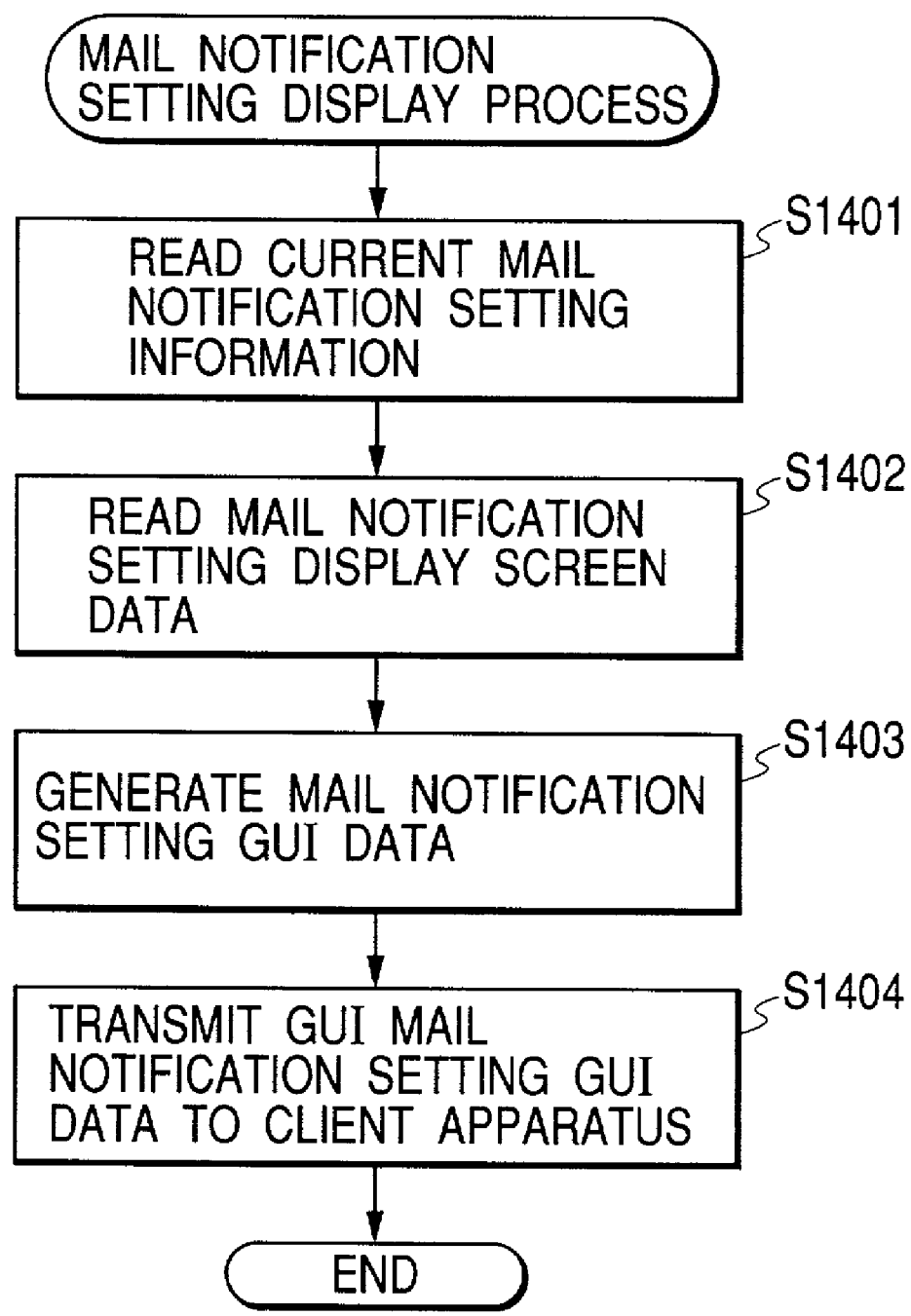
FIG. 14 is a flowchart showing an example of the first data transfer process performed by the network control unit of the device shown in FIG. 12 according to the second embodiment of the present invention.

FIG. 14 is a flowchart of the process performed in the network control unit 1103 of the device 1101 when the GUI data relating to setting an electronic mail notification is transmitted to the client apparatus 1301. Although not shown in the attached drawings, the control program for performing this process is stored in the storage medium in the network control unit 1103, and executed by the network control unit 1103.

When a request to transmit GUI data for mail notification settings is issued by the client apparatus 1301 through the network 1201, the network control unit 1103 reads the mail notification setting information set in the device 1101 from the mail notification setting information memory 1107 in S1401, thereby passing control to step S1402.

In step S1402, the network control unit 1103 reads the mail notification setting display screen data stored in the mail notification setting screen memory 1106, thereby passing control to step S1403.

In step S1403, the network control unit 1103 generates the GUI data referred to when data is displayed on the client apparatus 1301 as shown in FIG. 13 based on the mail notification setting information and the mail notification setting display data, thereby passing control to step S1405.

In step S1405, the network control unit 1103 transmits the generated GUI data to the client apparatus 1301 through the network 1201, thereby terminating the process.

Figure 15:
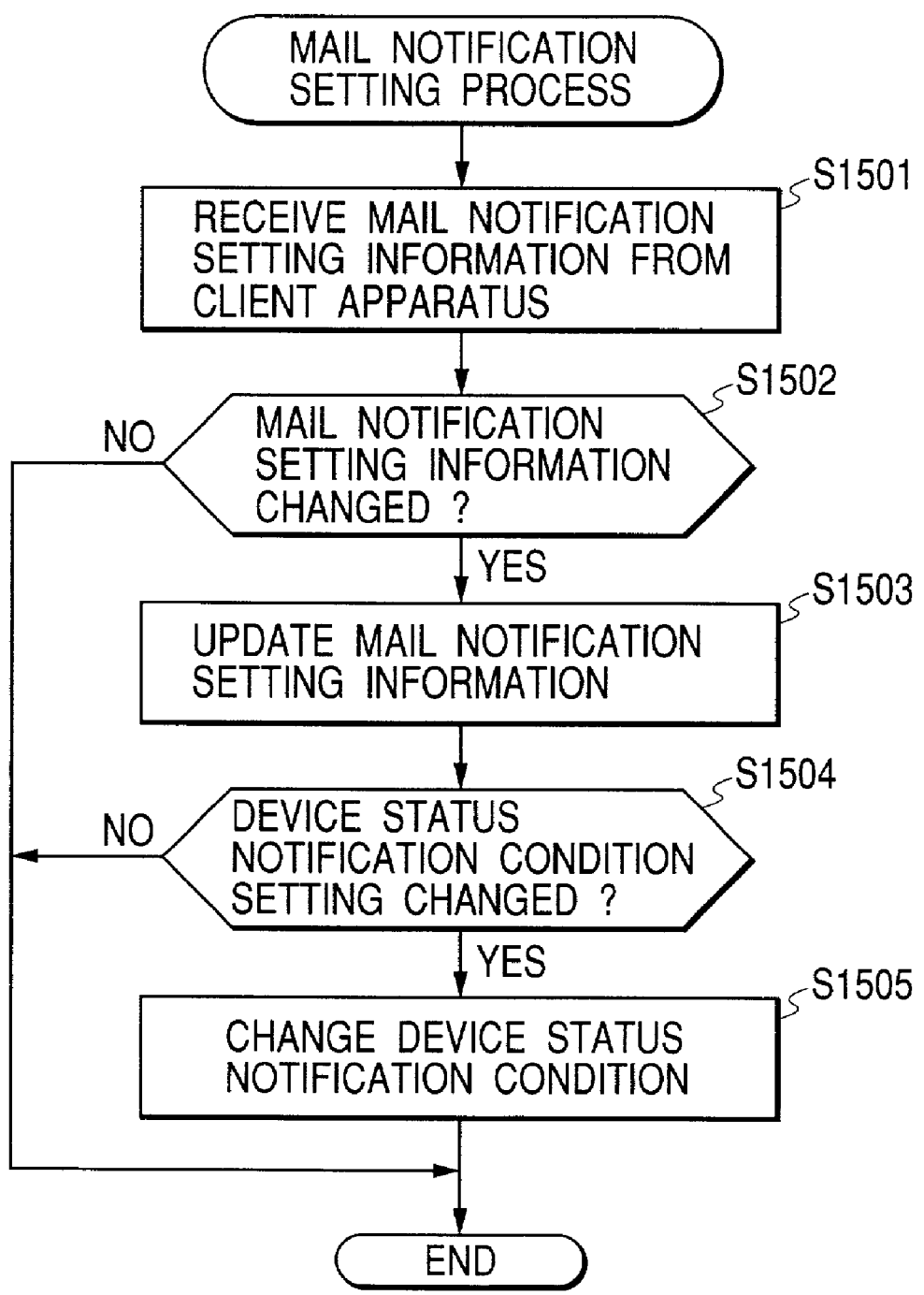
FIG. 15 is a flowchart of an example of the first data transfer process performed by the network control unit of the device shown in FIG. 12 according to the second embodiment of the present invention.

FIG. 15 is a flowchart of the process performed in the network control unit 1103 of the device 1101 according to the second embodiment of the present invention when the electronic mail notification setting information is set in the device 1101. Although not shown in the attached drawings, the control program for executing this process is stored in the storage medium in the network control unit 1103, and is executed by the network control unit 1103.

In step S1501, when the network control unit 1103 receives mail notification setting information from the client apparatus 1301 through the network 1201, control is passed to step S1502.

In step S1502, the network control unit 1103 compares the contents between the received mail notification setting information and the mail notification setting information stored in the mail notification setting information memory 1107 in the network control unit 1103. If it is determined that there is a change in the mail notification setting information, control is passed to step S1503. If it is determined that there is no change in the mail notification setting information, then the process terminates.

In step S1503, the network control unit 1103 updates the mail notification setting information stored in the mail notification setting information memory 1107 according to the received mail notification setting information, thereby passing control to step S1504.

In step S1504, the network control unit 1103 determines whether or not it is necessary to change the notification condition of the status change of the device 1101 according to the received mail notification setting information. If it is necessary to change the notification condition of the status change of the device 1101, then control is passed to step S1505. If it is not necessary to change the notification condition of the status change of the device 1101, the process terminates.

As described above, in the network system according to the second embodiment of the present invention, the device 1101 comprises the mail notification setting information memory 1107 for holding the transmission setting information for transmission of electronic mail containing a message described in a natural language depending on the status information about the status of the device to the client apparatus 1301, the mail notification setting screen generation unit 1105 for generating the GUI data of the transmission setting information displayed on the client apparatus 1301, and the network interface 1114 for transmitting the generated GUI data to the client apparatus 1301. Therefore, the following operations and effects can be obtained.

With the above mentioned configuration, the necessary setting process performed when the status information about the device 1101 is notified by electronic mail can be changed while the client apparatus 1301 is confirming the current setting information about the device 1101.

That is, it is possible for the client apparatus 1301 to instruct the device 1101 without using an exclusive application to obtain and transfer the information for management of the device 1101.

Therefore, a device and a network system capable of more efficiently notifying the user of the client apparatus of the information about the status of the device can be provided.

Furthermore, by setting in advance the mail address of the manager of the device, the maintenance staff, etc. as the address of the reply to the electronic mail, in electronic mail transmitted from the device 1101, the user who has received electronic mail can quickly issue an inquiry about the device 1101 to an appropriate contact without considering the mail address of the manager, the maintenance staff, etc.

Furthermore, depending on the status type of the device 1101, for example, the mail address of the maintenance staff can be set as a reply destination address in case of a device error, and the mail address of the fixtures manager can be set as a reply destination address in case of a request to exchange expendables. As a result, an inquiry can be quickly issued to an appropriate contact depending on the status of the device 1101.

Therefore, a system capable of further reducing the load of the user involved in the maintenance management of the device can be successfully provided.

Third Embodiment

As in the first embodiment of the present invention, the network system according to the third embodiment of the present invention comprises a device 101, a client apparatus 301, and a mail server apparatus 302. The device 101 comprises: a device control unit 102 comprising a printer engine unit 105, a device status change notification unit 106, a status message transmission unit 110, and a status message data unit 111; a network control unit 103 comprising a device status change detection unit 107, a mail message generation unit 108, a status message obtaining unit 109, a mail header/footer data unit 112, a mail transmission unit 113, and a network I/F 114; and a device I/F 104 (refer to FIG. 1). The detailed configuration of each unit is described in detail by referring to the above mentioned first embodiment, and the explanation is omitted here.

The difference between the third and first embodiments of the present invention is that the network control unit 103 of the device 101 comprises a substitute message storage unit (not shown in the attached drawings), and a prepared substitute message is a message to be transmitted to the client apparatus 301 when a message in a natural language cannot be obtained from the device control unit 102 depending on the status information about the device 101. Otherwise, the third embodiment is the same as the first embodiment of the present invention.

Next, the operations of the network system according to the third embodiment of the present invention with the above mentioned configuration is described below in detail by referring to FIGS. 8, 9, 16, 17, and 18.

The process of notifying the network control unit 103 of the status of the device 101 in the device control unit 102 of the device 101 according to the third embodiment of the present invention (refer to FIG. 2), an example of the format of the transmission data about the status of the device (refer to FIG. 3), an example of the transmission data of the status information about the device (refer to FIG. 4), the process performed when the status information about the device in the device control unit 102 is transmitted to the network control unit 103 as a message in a natural language readable by a person (refer to FIG. 5), and an example of status message data indicating each status of the device (refer to FIG. 6), and an example of transmitting electronic mail when an error occurs in the device 101 (refer to FIG. 10) according to the third embodiment of the present invention are all the same as in the first embodiment of the present invention, the explanation is omitted here.

Figure 16:
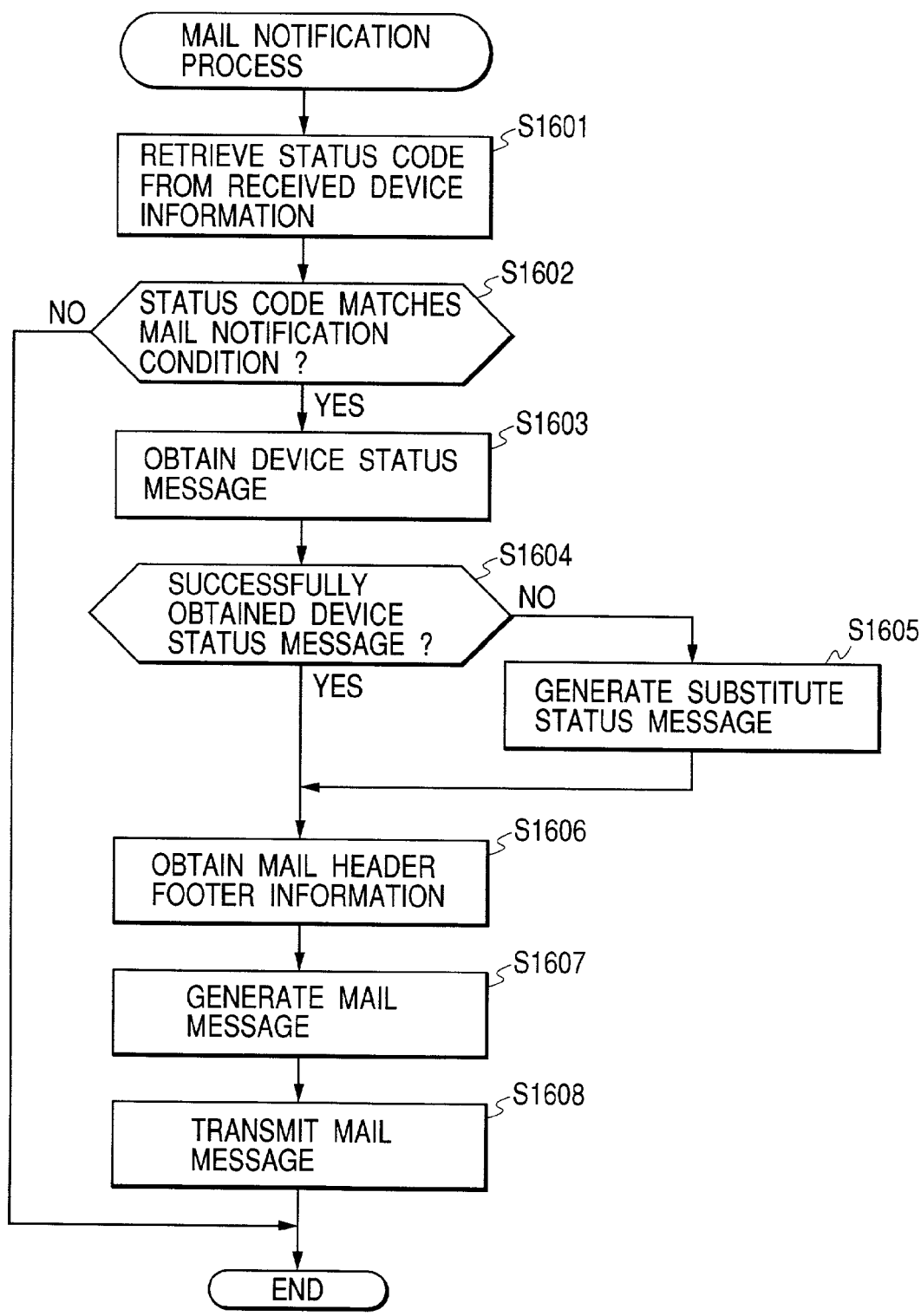
FIG. 16 is a flowchart of an example of the data transfer process performed by the network control unit of the device shown in FIG. 1 according to the third embodiment of the present invention.

FIG. 16 is a flowchart of the process performed when the status information about the device 101 is transmitted as electronic mail to the client apparatus 301 through the mail server apparatus 302 connected to the network 201 in the network control unit 103 of the device 101 according to the third embodiment of the present invention. Although not shown in the attached drawings, the control program for performing this process is stored in the storage medium in the network control unit 103, and executed by the network control unit 103.

In step S1601, when the network control unit 103 receives the status information about the device 101 from the device control unit 102, it obtains a status code from the received status information, and control is passed to step S1602.

In step S1602, the network control unit 103 determines whether or not the status code assigned to each notification type and stored in the network control unit 103 as shown in FIGS. 8 and 9 matches the status code obtained from the device control unit 102. If they match each other, then control is passed to step S1603. If they do not match each other, then the process terminates.

In step S1603, the network control unit 103 obtains from the device control unit 102 as a message in a natural language readable by a person the status information about the device 101 corresponding to the status code obtained from the device control unit 102, thereby passing control to step S1604.

In step S1604, the network control unit 103 determines whether or not a message corresponding to the above mentioned status code has been obtained from the device control unit 102. If it has been successfully obtained, control is passed to step S1606. If it has not been successfully obtained, control is passed to step S1605. Then, a substitute message as shown in FIG. 17 and stored in the substitute message storage unit (not shown in the attached drawings) in the network control unit 103 is obtained, thereby passing control to step S1606.

In step S1606, the network control unit 103 obtains the destination information for the electronic mail and the information to be added to the electronic mail from the mail header/footer data unit 112 holding in advance the mail header and hooter information about the network control unit 103, thereby passing control to step S1607.

In step S1607, the network control unit 103 generates the transmission data of electronic mail by composing a message with the information obtained in step 1603 or 1605 and step S1606, thereby passing control to step S1608.

In step S1608, the network control unit 103 transmits the transmission data indicating the status information about the device 101 as electronic mail to the destination client apparatus 301 through the mail server apparatus 302 connected to the network 201, thereby terminating the process.

FIG. 8 is an explanatory view of the status code corresponding to each error status in the device 101 according to the third embodiment of the present invention. In the example shown in FIG. 8, the operator call is assigned a status code corresponding to the status of an error in which a user can perform a recovery process in the errors occurring in the device 101 such as paper jam, etc. On the other hand, a service call is assigned a status code indicating the status of an error from which it is difficult for a user to recover, for example, a fault of the device 101, etc.

FIG. 9 is an explanatory view of the status code corresponding to a request to exchange various expendables used by the device 101 according to the third embodiment of the present invention. In the example shown in FIG. 9, for example, status codes indicating a request to exchange a toner cartridge, a request to supply staples of a stapler used when plural sheets of printed paper are to be bound, etc. are assigned.

FIG. 17 is an explanatory view of the substitute message data stored in the network control unit 103 applied when the network control unit 103 of the device 101 according to the third embodiment of the present invention cannot obtain a message indicating the status of the device from the device control unit 102. In the example shown in FIG. 17, a substitute message corresponding to the status code which may not be obtained from the device control unit 102 is stored.

FIG. 11 is an explanatory view of an example of transmitting electronic mail generated by the network control unit 103 shown in FIG. 16 according to the third embodiment of the present invention, and transmitted when a status change of a request to exchange expendables of the device 101 is made. In the example shown in FIG. 11, for example, when the toner used in performing a printing process by the printer engine unit 105 of the device 101 is running short, a message instructing the destination user to set a new toner cartridge is transmitted by electronic mail.

FIG. 18 is an explanatory view of an example of transmitting electronic mail using a substitute message stored in the network control unit 103 when a message indicating the status of the device 101 cannot be obtained from the device control unit 102 if an error occurs in the device 101, and generated by the network control unit 103 as shown in FIG. 16 according to the third embodiment of the present invention. The example shown in FIG. 18 shows a message as electronic mail transmitted as a substitute message for the status message when the error in the device 101 corresponds to a service call as a device error type.

As described above, in the network system according to the third embodiment of the present invention, the device 101 comprises the device status change detection unit 107 for obtaining the status information about the status of the device, the status message obtaining unit 109 for obtaining a message in a natural language based on the obtained status information, the mail header/footer data unit 112 storing the destination information, the mail message generation unit 108 for generating transmission data according to the message and the destination information, and the mail transmission unit 113 for transmitting the generated transmission data as electronic mail to the client apparatus 301. With the configuration, if the network control unit 103 cannot obtain a message in a natural language depending on the status information about the device 101 from the device control unit 102, then a predetermined substitute message is defined as a message to be transmitted to the client apparatus 301, thereby obtaining the following operations and effects.

With the above mentioned configuration, when a status change such as an error, etc. occurs in the device 101, the network control unit 103 generates transmission data from a message in a natural language obtained from the device control unit 102, and notifies at an appropriate timing by electronic mail through the mail server apparatus 302 the user of the client apparatus 301, which is the destination, of the status of the device 101 based on the electronic mail address held in the mail header/footer data unit 112.

In this case, if a message cannot be successfully obtained from the device control unit 102, then the network control unit 103 obtains a substitute message as shown in FIG. 17 and stored in the substitute message storage unit (not shown in the attached drawings) in the network control unit 103. Furthermore, it obtains the destination information including the information about the destination of the electronic mail and the information to be added to the electronic mail from the mail header/footer data unit 112, generates transmission data by combining the information with the substitute message, and transmits the transmission data as electronic mail to the client apparatus 301.

That is, since the transmission data generated according to the message dependent on the status information about the device 101 based on a status change of the device 101 and the destination information is transmitted as electronic mail to the client apparatus 301, the user managing the device 101 can be allowed to recognize the status of the device 101 at an appropriate timing.

In addition, by holding the message indicating each status of the device 101 in the device control unit 102 of the device 101, it is not necessary for the client apparatus 301 for per-forming the data transfer process between the client apparatus 301 and the device 101 to hold the information dependent on the device 101. Therefore, the above mentioned network control unit 103 can be applied as is to a device having the same system configuration but comprising a different device control unit.

Therefore, it is possible to provide a device and a network system capable of efficiently notifying the user of the client apparatus of the information about the status of the device.

Other Embodiments (1) In the first embodiment of the present invention, electronic mail can be transmitted as a status change of the device notified by electronic mail in addition to an error and a request to exchange expendables depending on the status change such as a warning that the paper is running short, etc., an end of the printing process, etc. In addition, address information such as the IP address, the FAX number, etc. of a device can be added as the information to be added to the electronic mail for notification of the status of the device.

(2) In the second embodiment of the present invention, a notification timing of electronic mail set for the device can be limited to a specific status of the device, for example, an error of paper jam. At this time, the setting method can be directly inputting a status code.

(3) In the above mentioned second embodiment of the present invention, the possible number of notification setting conditions of electronic mail is not limited two, but a plurality of notification setting conditions can be obviously set.

(4) In the above mentioned first to third embodiments of the present invention, the device connected to a network can be a printer having the function of forming an image, but also can be, for example, a copying machine and a complex unit (MFP) having the function of forming an image, reading an image, etc. in addition to a printer.

(5) In the above mentioned first to third embodiments of the present invention, a client apparatus and a device are connected to the network, but any number of client apparatus and device can be connected.

(6) In the above mentioned third embodiment of the present invention, a substitute message storage is provided in the network control unit 103, but the substitute message storage unit can be replaced with, for example, the status message obtaining unit 109 of the network control unit 103 for storing a substitute message in advance.

(7) According to the first and second embodiments of the present invention, the address of the reply to the electronic mail is the mail address of the manager of the device, the mail address of the maintenance staff of the device, the mail address of the fixtures manager of the device, etc., but can be any mail address at which a user can quickly issue an inquiry to an appropriate contact.

The present invention can be applied to a system configured by a plurality of units, or to a device including a single unit. It is obvious that the present invention can also be realized by providing a medium such as a storage medium, etc. storing a program code of software for realizing the function of the above mentioned embodiments for a system or a device, and by a computer (or a CPU, an MPU, etc.) of the system of the device reading and executing the program code stored in the medium such as a storage medium, etc.

In this case, the program code read from the medium such as a storage medium, etc. realizes the functions of the above mentioned embodiments, and the medium such as a storage medium, etc. storing the program code configures the present invention. A medium such as a storage medium, etc. for providing a program code can be, for example, a floppy disk, a hard disk, an optical disk, a magneto-optic disk, CD-ROM, CD-R, a magnetic tape, a non-volatile memory card, ROM, a download through a network, etc.

Furthermore, not only the functions of the above mentioned embodiments can be realized by the computer executing the read program, but also a part or all of the actual process can be performed at an instruction of the program code by the OS, etc. operating in the computer, thereby possibly realizing the functions of the above mentioned embodiments in the process.

Additionally, after the program code read from a medium such as a storage medium, etc. is written to a function extension board inserted into the computer or the memory provided in the function extension unit connected to the computer, the CPU, etc. provided in the function extension board or the function extension unit can perform a part or all of the actual process at an instruction of the program code, thereby realizing the functions of the above mentioned embodiments by the process.

Figure 20:
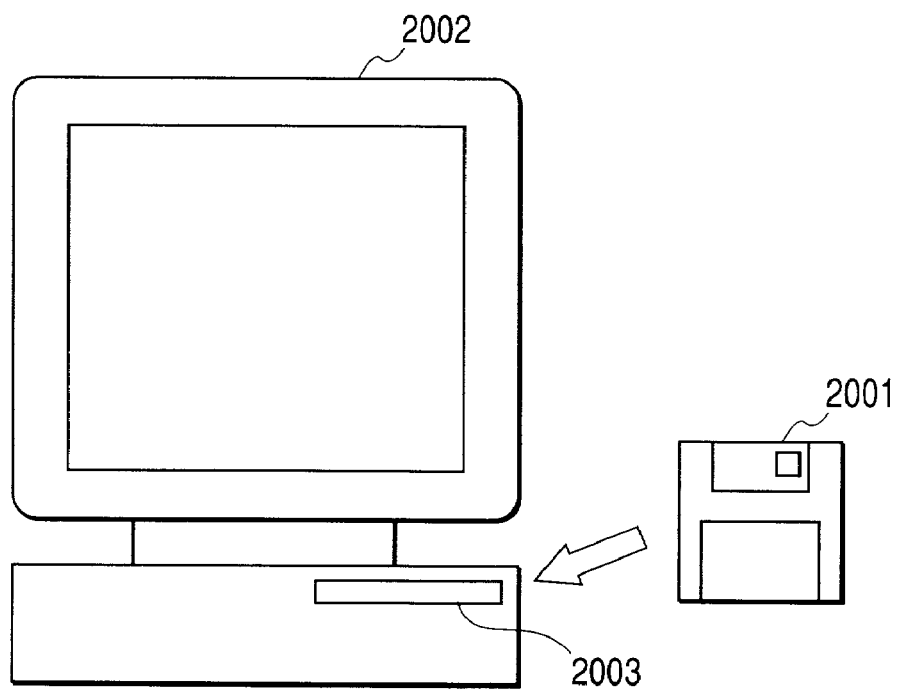
FIG. 20 shows an example of the concept of providing a program for execution of the data transfer method according to the present invention and the relevant data from the storage medium for a device such as a computer, etc.

FIG. 20 is an explanatory view of an example of the concept of providing a program and relevant data for realizing the data transfer method according to the present invention for a device such as a computer, etc. from a storage medium. The program and relevant data for realizing the data transfer method according to the present invention can be provided by inserting a floppy disk and a storage medium 2001 such as CD-ROM, etc. into a slot 2003 of the storage medium drive provided for a device 2002 such as a computer, etc. Then, the program and the relevant data for execution of the data transfer method is loaded from the storage medium 2001 temporarily into the hard disk, and then from the hard disk into the RAM, or directly loaded into the RAM without installing it in the hard disk, thereby executing the program and relevant data.

In this case, in the network system according to the first to third embodiment of the present invention, if a program for executing the data transfer method according to the present invention is allowed to actually use the method, for example, the program and the relevant data are provided for each device forming part of the network system through the device such as the computer as described above by referring to FIG. 20, or the program and the relevant data are stored in advance in each device forming part of the network system.

Figure 19:
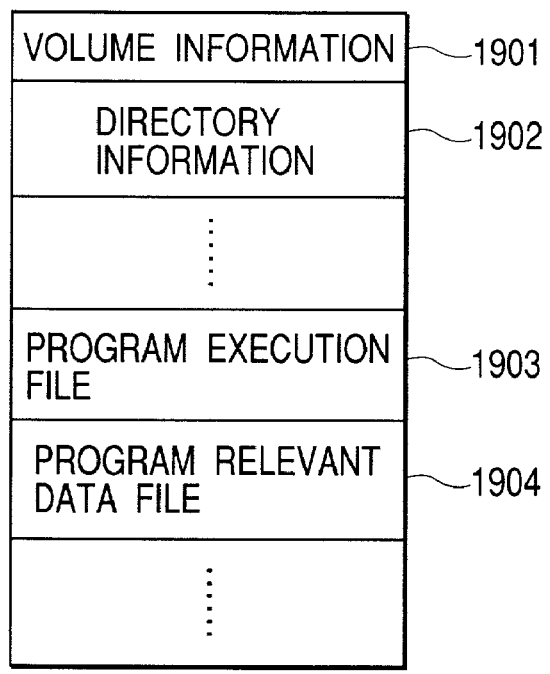
FIG. 19 shows an example of the configuration of the contents stored in the storage medium which stores a program for execution of the data transfer method according to the present invention, and the relevant data.

FIG. 19 shows an example of the configuration of the contents stored in the storage medium storing the program and the relevant data for execution of the data transfer method according to the present invention. The storage medium stores, for example, the volume information 1901, the directory information 1902, the program execution file 1903, the program relevant data file 1904, etc. The program for execution of the data transfer method according to the present invention is encoded into program code based on each of the above mentioned flowcharts.

As described above, according to the data transfer process apparatus of the present invention, since the transmission data generated according to the message dependent on the status information about the device based on a status change of the device and the destination information is transmitted as electronic mail to the client apparatus, the user managing the device can be allowed to recognize the status of the device at an appropriate timing.

Furthermore, it is possible for any client apparatus to instruct the device to obtain and transfer the information for management of the device without using an exclusive application. Especially, the user can set a condition of transmitting electronic mail without an exclusive application program. In addition, the destination of electronic mail can be set for each condition of transmitting the electronic mail. A signature of an electric mail can also be set.

Additionally, the message indicating each status of the device can be held in the device control unit of the device so that the data transfer process apparatus (network control unit) for performing the data transfer process among the client apparatus and the device can be free of holding the information depending on the device. As a result, the above mentioned data transfer process apparatus (network control unit) can be applied as is to a device having the same system configuration and a different device control unit.

When a message in a natural language depending on the status information about the device cannot be obtained, a predetermined substitute message is transmitted to the client apparatus. Therefore, as described above, the user managing the device can be allowed to recognize the status of the device at an appropriate timing.

Therefore, it is possible to provide a device and a network system capable of efficiently notifying the user of the client apparatus of the information about the status of the device.

Furthermore, by setting in advance the mail address of the manager of the device, the maintenance staff, etc. as the address of the reply to the electronic mail, the user who has received electronic mail can quickly issue an inquiry about the device to an appropriate contact without considering the mail address of the manager, the maintenance staff, etc.

Furthermore, depending on the status type of the device, for example, the mail address of the maintenance staff can be set as a reply destination address in case of a device error, and the mail address of the fixtures manager can be set as a reply destination address in case of a request to exchange expendables. As a result, an inquiry can be quickly issued to an appropriate contact depending on the status of the device.

Therefore, a system capable of further reducing the load of the user involved in the maintenance management of the device can be successfully provided.

Furthermore, in the device according to the present invention, the network system according to the present invention, the data transfer method according to the present invention, and the storage medium according to the present invention, as in the above mentioned embodiments, a device and a network system capable of more efficiently notifying the user of the client apparatus of the information about the status of the device can be provided.

What is claimed is:

1. A data transfer processing apparatus which controls data transfer in a device, comprising:
   a registration unit that registers reply destination information indicating each of a plurality of reply destinations, the plurality of reply destinations being different from each other and corresponding to a respective plurality of statuses of the device, wherein the reply destination information refers to an address to which an answer is transmitted in response to an electronic mail;
   a status obtaining unit that obtains status information about one of the plurality of statuses of said device;
   a message obtaining unit that obtains a message according to the status information obtained by said status obtaining unit;
   a transmission data generation unit that generates transmission data according to the message obtained by said message obtaining unit, according to destination information indicating a destination address to which the transmission data is transmitted, and according to the reply destination information indicating one of the plurality of reply destinations, which is determined based on the status information obtained by said status obtaining unit, wherein the generated transmission data includes the destination information and the reply destination information indicating one of the plurality of reply destinations, which is determined based on the status information obtained by said status obtaining unit, the reply destination indicated by the reply destination information being a destination for a reply to the electronic mail; and an electronic mail transmission unit that transmits as electronic mail the transmission data generated by said transmission data generation unit.

2. The data transfer processing apparatus according to claim 1, further comprising:

a data generation unit that generates data that causes a web browser of an external apparatus to display a setting screen, the setting screen being for setting the destination information and the reply destination information;

a data transmission unit that transmits the data generated by said data generation unit to the external apparatus via a network; and a reception unit that receives the destination information and the reply destination information set with the setting screen from the external apparatus via the network, wherein said registration unit registers the reply destination information received by said reception unit.

3. The data transfer processing apparatus according to claim 1, further comprising a storage unit that stores the reply destination information registered by said registration unit.

4. The data transfer processing apparatus according to claim 1, wherein said data transfer processing apparatus is a network board connected to a printer.

5. A device that communicates with an external apparatus, comprising:

a registration unit that registers reply destination information indicating a first reply destination of electronic mail corresponding to each of a plurality of reply destinations, the plurality of reply destinations being different from each other and corresponding to a respective plurality of statuses of the device, wherein the reply destination information refers to an address to which an answer is transmitted in response to an electronic mail;

a status obtaining unit that obtains status information about one of the plurality statuses of said device;

a message obtaining unit that obtains a message according to the status information obtained by said status obtaining unit;

a transmission data generation unit that generates transmission data according to the message obtained by said message obtaining unit, according to destination information indicating a destination address to which the transmission data is transmitted, and according to the reply destination information indicating one of the plurality of reply destinations, which is determined based on the status information obtained by said status obtaining unit, wherein the generated transmission data includes the destination information and the reply destination information indicating one of the plurality of reply destinations, which is determined based on the status information obtained by said status obtaining unit, the reply destination indicated by the reply destination information being a destination for a reply to the electronic mail; and an electronic mail transmission unit that transmits as electronic mail the transmission data generated by said transmission data generation unit.

6. The device according to claim 5, further comprising:

a data generation unit that generates data that causes a web browser of an external apparatus to display a setting screen, the setting screen being for setting the destination information and the reply destination information;

a data transmission unit that transmits the data generated by said data generation unit to the external apparatus via a network; and a reception unit that receives the destination information and the reply destination information set with the setting screen from the external apparatus via the network, wherein said registration unit registers the reply destination information received by said reception unit.

7. The device according to claim 5, further comprising a storage unit that stores the reply destination information registered by said registration unit.

8. The device according to claim 5, wherein said device is a printer.

9. A status notifying method of a device for notification of a status of the device by electronic mail, comprising:

a registration step of registering reply destination information indicating each of a plurality of reply destinations, the plurality of reply destinations being different from each other and corresponding to a respective plurality of statuses of the device, wherein the reply destination information refers to an address to which an answer is transmitted in response to an electronic mail;

a status obtaining step of obtaining status information about one of the plurality statuses of the device;

a message obtaining step of obtaining a message according to the status information obtained in said status obtaining step;

a transmission data generating step of generating transmission data according to the message obtained in said message obtaining step, according to destination information indicating a destination address to which the transmission data is transmitted, and according to the reply destination information indicating one of the plurality of reply destinations, which is determined based on the status information obtained by said status information obtaining step, wherein the generated transmission data includes the destination information and the reply destination information indicating one of the plurality of reply destinations, which is determined based on the status information obtained by said status obtaining step, the reply destination indicated by the reply destination information being a destination for a reply to the electronic mail; and an electronic mail transmitting step of transmitting as electronic mail the transmission data generated in said transmission data generating step.

10. The status notifying method according to claim 9, further comprising:

a data generating step of generating data that causes a web browser of an external apparatus to display a setting screen, the setting screen being for setting the destination information and the reply destination information;

a data transmitting step of transmitting the data generated in said data generating step to the external apparatus via a network; and a receiving step of receiving the destination information and the reply destination information set with the setting screen from the external apparatus via the network, wherein the destination information and the reply destination information received in said receiving step are registered in said registration step.

11. The status notifying method according to claim 9, further comprising a storing step of storing the reply destination information registered in the registering step.

12. The status notifying method, according to claim 9 wherein said device is a printer.

13. A computer-readable storage medium storing a computer-readable program used by a device for notification of a status of the device by electronic mail, said program comprising:

- a registration step of registering reply destination information indicating a first reply destination of electronic mail corresponding to each of a plurality of reply destinations, the plurality of reply destinations being different from each other and corresponding to a respective plurality of statuses of the device, wherein the reply destination information refers to an address to which an answer is transmitted in response to an electronic mail;
- a status information obtaining step of obtaining status information about one of the plurality of statuses of the device;
- a message obtaining step of obtaining a message according to the status information obtained in said status obtaining step;
- a transmission data generating step of generating transmission data according to the message obtained in said message obtaining step, according to destination information indicating a destination address to which the transmission data is transmitted, and according to the reply destination information indicating one of the plurality of reply destinations, which is determined based on the status information obtained by said status obtaining step, wherein the generated transmission data includes the destination information and the reply destination information indicating one of the plurality of reply destinations, which is determined based on the status information obtained by said status obtaining step, the reply destination indicated by the reply destination information being a destination for a reply to the electronic mail; and
- an electronic mail transmitting step of transmitting as electronic mail the transmission data generated in said transmission data generating step.

* * * * *